United States Patent [19]

Goldmann et al.

[11] Patent Number: 5,626,634

[45] Date of Patent: May 6, 1997

[54] AQUEOUS COMPOSITIONS OF SOLVENT-SOLUBLE DYESTUFFS

[75] Inventors: Jürgen Goldmann, Münchenstein; Bansi L. Kaul, Biel-Benken, both of Switzerland

[73] Assignee: Sandoz Ltd., Basle, Switzerland

[21] Appl. No.: 347,986

[22] Filed: Dec. 2, 1994

Related U.S. Application Data

[63] Continuation of Ser. No. 123,958, Sep. 20, 1993, abandoned.

[30] Foreign Application Priority Data

Sep. 21, 1992 [GB] United Kingdom .................. 9219909

[51] Int. Cl.$^6$ ...................................... C09B 67/00
[52] U.S. Cl. ................... 8/527; 8/528; 8/602; 8/607; 8/609; 8/611; 8/938; 8/561
[58] Field of Search ........................... 8/527, 528, 602, 8/607, 609, 611, 938, 561

[56] References Cited

U.S. PATENT DOCUMENTS

| | | | |
|---|---|---|---|
| 3,617,183 | 11/1971 | Grosklos | 8/93 |
| 3,809,533 | 5/1974 | Sievenpiper | 8/93 |
| 4,063,880 | 12/1977 | Tullio | 8/521 |
| 4,066,595 | 1/1978 | Bunge | 260/29.4 R |
| 4,359,418 | 11/1982 | Lienhard et al. | 260/156 |
| 5,298,034 | 3/1994 | Bast et al. | 8/552 |
| 5,391,207 | 2/1995 | Gerlach et al. | 8/437 |

*Primary Examiner*—Margaret Einsmann
*Attorney, Agent, or Firm*—Robert S. Honor; Carl W. Battle; Gabriel Lopez

[57] ABSTRACT

A liquid dyestuff composition comprising a solvent-soluble dyestuff and a water miscible organic solvent, the composition comprising over 25% by weight of dissolved dyestuff.

11 Claims, No Drawings

AQUEOUS COMPOSITIONS OF SOLVENT-SOLUBLE DYESTUFFS

This is a continuation of application Ser. No. 08/123,958, filed Sep. 20, 1993, abandoned.

This invention relates to dyestuffs and more particularly to solutions of dyestuffs and to a method of preparing such solutions.

The handling of dyestuffs in powder form is difficult because of the generation of dust and the resulting possible toxicity and explosion hazards. Hygienic, environmental and safety considerations make it desirable to use solutions of solvent-soluble dyestuffs, particularly solutions of potentially dangerous heavy metal types of dyestuff, such as chromium and cobalt premetallised dyestuffs.

However, a problem that is commonly encountered with many solvent dyestuffs is the difficulty in dissolving sufficient quantity of dyestuff. This problem has been exacerbated by increasing environmental awareness which has made it mandatory that a high level of dyestuff solubilisation is achieved.

The present methods of dyestuff solution preparation are frequently poor in this respect.

It has now been found that an unusually high rate of dissolution of dyestuff can be achieved by a process according to the invention.

According to the invention, there is provided a process for the preparation of a liquid composition comprising, i) mixing an aqueous presscake of a solvent soluble dyestuff into a water miscible liquid (e.g. solvent); and ii) distilling off the water until a water content of 15% or less by weight of the mixture is attained.

This process will generally allow dissolved dyestuff concentrations of up to 50% (preferably 20–50%) by weight of the composition to be achieved. More preferably the composition comprises 25–50% of dissolved dyestuff by weight of the total composition.

Any solvent-soluble dyestuff known in the art can be used. The invention works particularly well when the dyestuff used is a 1,2-metal complex dyestuff, more particularly when the metal is selected from chromium, cobalt, copper or aluminium or mixtures thereof. Preferably such dyes are of the azo series or of the copper phthalocyanine series.

Non metallised solvent dyestuffs may also be used in the present invention, preferably of the anthraquinone series.

Typical of the dyestuffs that can be used are:
C.I. Solvent Black 45
C.I. Solvent Blue 44
C.I. Solvent Brown 28
C.I. Acid Violet 66
C.I. Solvent Red 8
C.I. Solvent Red 91
C.I. Solvent Red 92
C.I. Solvent Red 127
C.I. Solvent Red 124
C.I. Solvent Red 89
C.I. Solvent Red 90:1
C.I. Solvent Orange 41
C.I. Solvent Orange 62
C.I. Solvent Yellow 83
C.I. Solvent Yellow 62
C.I. Solvent Yellow 48
C.I. Solvent Yellow 79
C.I. Solvent Yellow 83:1 and
C.I. Solvent Blue 45 (non metallised)

Aluminium solvent dyestuffs are also suitable for use in the present invention, as exemplified in British Patent Publication No. 2 259 305A; the contents of which are incorporated herein by reference.

More preferred dyestuffs used in the invention are:
C.I. Solvent Black 45
C.I. Solvent Blue 44
C.I. Solvent Brown 28
C.I. Acid Violet 66
C.I. Solvent Orange 41
C.I. Solvent Red 8
C.I. Solvent Red 91
C.I. Solvent Red 92
C.I. Solvent Yellow 62; and
C.I. Solvent Yellow 83

Any water miscible solvent known in the art may be used in the present invention. Preferably the solvent comprises one or more solvents that form an azeotropic mixture with water. Blends of solvents may also be used. Typical classes of solvent that can be used in the present invention are selected from aprotic solvents (like dimethylformamide and dimethylsulphoxide) alkanols (eg glycols and alcohols), ethers and ketones. Examples of suitable solvents include: propylene glycols (especially 1-methoxy-2-propanol), tetrahydrofurfuryl alcohol, dimethylformamide and dimethylsulphoxide.

An especially preferred class of solvent is the dialkylene glycol monoalkyl ethers, most particularly propylene glycol monomethyl ether and dipropylene glycol monomethyl ether.

Further according to the invention, there is provided a liquid dyestuff composition comprising a solvent-soluble dyestuff and a water miscible organic solvent, the composition comprising over 20, (advantageously over 25% and preferably over 30%) by weight of dissolved dyestuff.

Preferably in such a composition at least 2%, preferably 2–15%, more preferably 2–10, most preferably 4–10% by weight of water is present.

Preferably the dyestuff concentration in a liquid dyestuff composition according to the invention is 20 to 50%. More preferably the composition comprises 25–50% of dissolved dyestuff by weight of the total composition.

Further according to the invention there is provided a process for preparing a liquid composition of a solvent dyestuff comprising:

a) mixing an aqueous presscake of the dyestuff into a solvent (this may simply be carried out by breaking the presscake into suitably sized fragments and stirring them into the solvent); and b) raising the temperature of the mixture to a temperature at which the water and some solvent readily distils off until the water content of the mixture drops below 15%: (the optimum temperature will vary depending on the solvent and the amount of water present, but a typical temperature is 98°–102° C. (where the solvent is dipropylene glycol monomethyl ether).

A typical aqueous presscake has a water content of between 30 and 60% by weight. It is preferred that the final water content is from 2–10%, more preferably 5–10%. It is undesirable to reduce the water content below 2% because the dyestuff solubility drops (it is essential to have more than 0%).

The resulting liquid composition of solvent-soluble dyestuffs is one that is easy and convenient to handle and in which the dissolved dyestuff content is significantly higher than those of previous liquid compositions of solvent dyestuffs. This means that dyeings of a particular depth can be carried out using a lesser amount of a liquid composition according to the present invention than that of an art recognised liquid solvent-soluble dyestuff composition. Volatile Organic Content (VOC) requirements can therefore be much more easily met.

The compositions according to the invention are particularly useful for dyeing leather and polyester, cellulose acetates (e.g. 2½ and 3) and regenerated cellulose (particularly, cellulose acetates (e.g. 2½ and 3) and regenerated cellulose dyed in the (solubilised) mass) and lacquers such as cellulose lacquers.

The invention will now be illustrated by the following Examples in which all parts and percentages are by weight unless indicated to the contrary.

EXAMPLE 1

A solution of CI Solvent Yellow 62 in dipropylene glycol monomethyl ether can be prepared as follows. The solution contains about 40% by weight dyestuff.

A reactor equipped with a stirrer, heater and distillation column is charged with 1500 parts of dipropylene glycol monomethyl ether (hereinafter referred to as the glycol solvent) and the glycol solvent is heated to 60° C. 1718 parts of an aqueous presscake of CI Solvent Yellow 62 (58.2% by weight of dyestuff) is gradually added with stirring to the glycol solvent.

This mixture is heated to 100°–110° C. while stirring and the mixture is distilled at 98°–102° C. to remove water, a total of 734 parts being removed. The distillate is about 90% water and 10% solvent. A dark brown solution remains in the reactor containing 40% dyestuff, 56% solvent and 4% water.

EXAMPLES 2 TO 6

Example 1 is repeated, replacing CI Solvent Yellow 62 with the same weight of the following dyestuffs:

| Example 2 | CI Solvent Yellow 83 |
| Example 3 | CI Solvent Orange 41 |
| Example 4 | CI Solvent Red 92 |
| Example 5 | CI Solvent Red 91 |
| Example 6 | CI Solvent Blue 45 |

In each case the result is a dark coloured solution of the dyestuff with a dye content of 40% or more.

EXAMPLE 7

Example 1 is repeated, replacing CI Solvent Yellow 62 with the same weight of a dyestuff of the formula (a compound according to Example 5 of British Patent Publication No. 2 259 305):

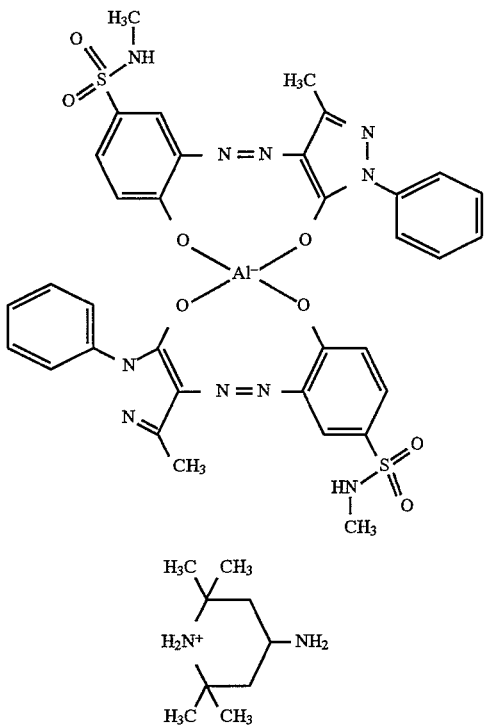

The result is a dark coloured solution of the dyestuff with a dye content of 40% or more.

EXAMPLES 8 TO 10

Example 7 is repeated, replacing the dyestuff of Example 5 of British Patent Publication No. 2 259 305 with the same weight of the following dyestuffs:

EXAMPLE 8

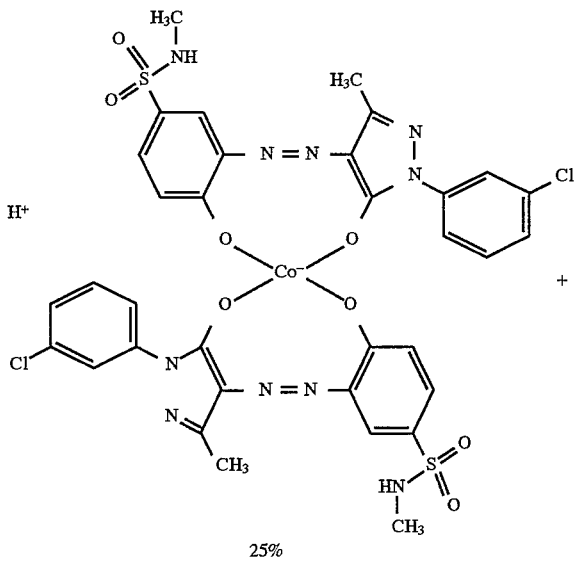

25%

-continued

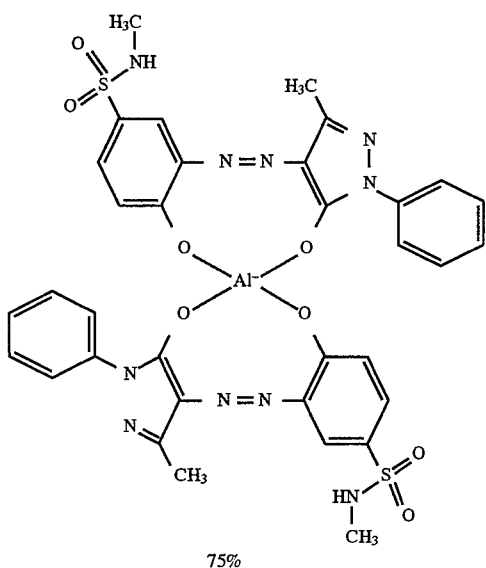

75%

EXAMPLE 9

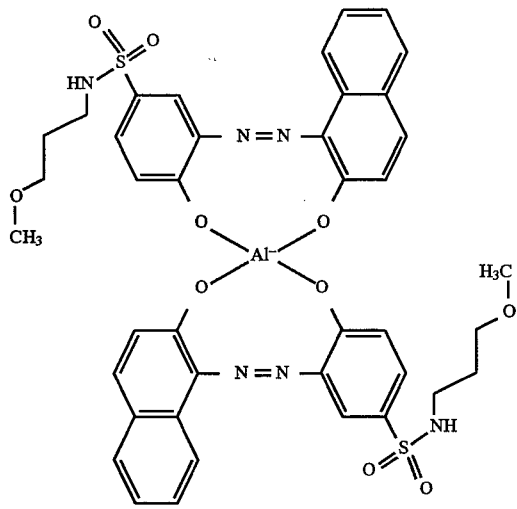

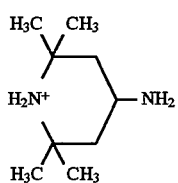

EXAMPLE 10

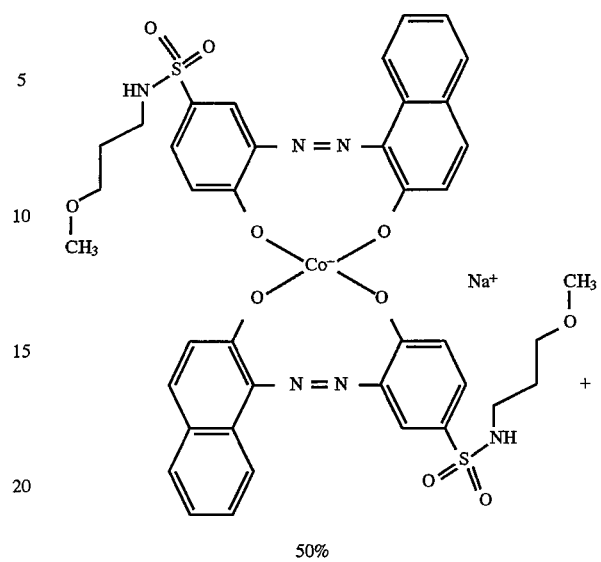

50%

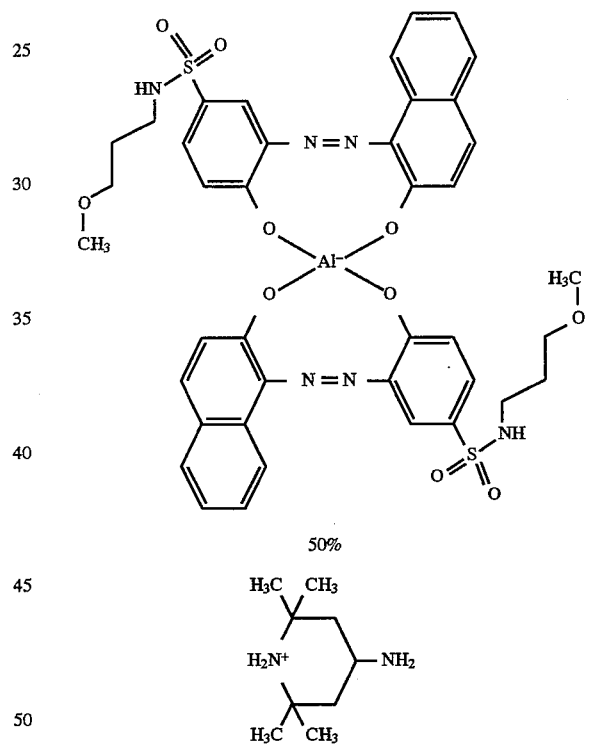

50%

Each of Examples 1 to 10 can be repeated by replacing the solvent, dipropylene glycol monomethyl ether, by 1500 parts of propylene glycol monomethyl ether.

APPLICATION EXAMPLE 18 parts of the dyestuff concentrate of Example 1 are stirred into 100 parts of a nitrocellulose lacquer prepared from:

18.8% of Nitrocellulose A15 (in the form of white flocs wetted with 35% isopropanol)

6.3% of an acrylic acid butyl ester polymer, a softener resin (Acronal 4F from BASF)

3.3% of diphenyloctylphosphate, a softener (Santiser 141 from Monsanto)

10.0% of methoxy propanol (Dowanol PM from Dow Chemical)

10.0% ethoxypropanol 41.6% ethanol and 10.0% ethyl acetate.

The solubility is good.

With a 25 mm blade, a wet film of this lacquer composition is placed on aluminium foil and the lacquer is dried for 5 hours at 130° C. A reddish yellow lacquer coating results with good light and migration fastness properties.

The Application Example is repeated using 10 to 25 parts (especially 15 parts) of any one of the dyestuff concentrations of Examples 2 to 10 in place of that of Example 1.

The text of UK 2,259,305A follows:

APPENDIX
A1
> Text of UK 2,259,305 A
— The invention relates to new aluminium complex-water solubilizing group-free compounds suitable as dyestuffs.
According to the invention, there is provided a compound of formula I or II
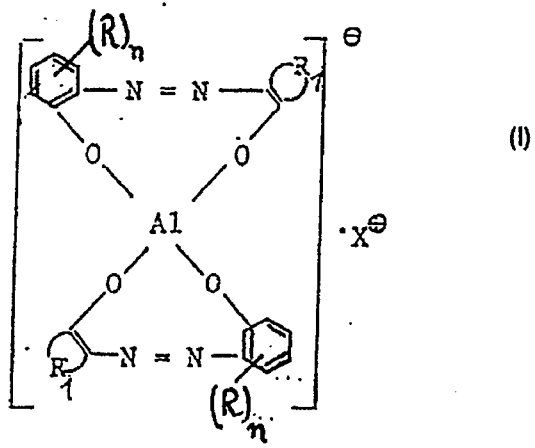
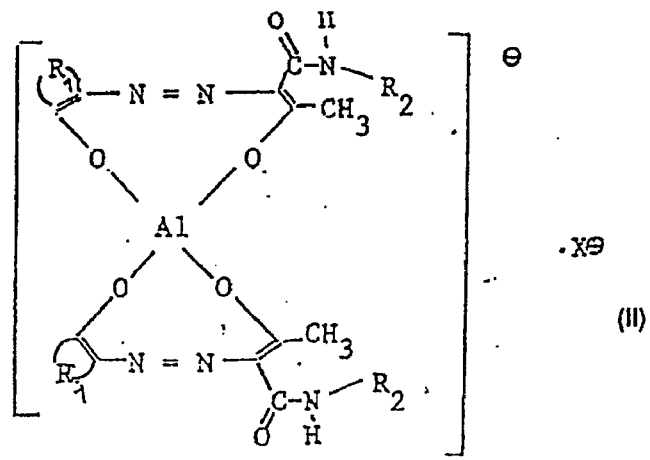

A 2 in which each n independently is 1 or 2;

each $R_1$ independently together with the -C=C- group to which they are attached form a single or fused aromatic or heteroaromatic ring system that is substituted or unsubstituted;

each R independently is selected from $C_{1-4}$alkyl, $C_{1-4}$alkoxy, cyano, -SCN $C_{1-4}$alkoxy carbonyl, benzoyl, phenoxycarbonyl, aminocarbonyl, mono ($C_{1-4}$alkyl)aminocarbonyl, di($C_{1-4}$alkyl)aminocarbonyl, mono-($C_{1-4}$alkoxy)-$C_{2-4}$alkyl amino-carbonyl, di($C_{1-4}$alkoxy-$C_{2-4}$alkyl)aminocarbonyl, phenylaminocarbonyl, aminosulphonyl, mono($C_{1-4}$alkyl)aminosulphonyl, di($C_{1-4}$ alkyl)aminosulphonyl, mono($C_{1-4}$alkoxy $C_{2-4}$alkyl)aminosulphonyl, di($C_{1-4}$alkoxy-$C_{2-4}$alkyl)aminosulphonyl and phenylaminosulphonyl and provided neither group $R_1$ in the compound of formula I is an unsubstituted 1-phenyl-3-methylpyrazolyl group, R may additionaly be selected from nitro;

each $R_2$ independently is unsubstituted or substituted phenyl, $C_{1-12}$alkyl and $C_{1-4}$alkoxy - $C_{2-8}$alkyl; and $X^+$ is a cation.

Preferred single or fused ring systems of $R_1$ are those of the benzene series, the naphthalene series and of the heteroaromatic series. Preferred heteroaromatic groups comprise five or six membered nitrogen and/or sulphur containing rings, most preferably of the pyrazolone or pyridone series.

Preferred substitutents by which any aromatic groups of $R_1$ or $R_2$ can be substituted are selected from halogen (preferably Cl and Br), OH, $C_{1-4}$alkyl, $C_{1-4}$alkoxy, cyano, -$NO_2$, $C_{1-4}$alkylcarbonyl, SCN, $C_{1-4}$alkoxycarbonyl, benzoyl, phenoxycarbonyl, $C_{1-4}$alkylcarbonyloxy, aminocarbonyl, mono($C_{1-4}$alkyl)aminocarbonyl, di($C_{1-4}$alkyl)aminocarbonyl, mono ($C_{1-4}$alkoxy-$C_{2-4}$alkyl)aminocarbonyl, di($C_{1-4}$alkoxy-$C_{2-4}$alkyl)aminocarbonyl, aminosulphonyl, mono($C_{1-4}$alkyl)aminosulphonyl, di($C_{1-4}$alkyl)aminosulphonyl, mono($C_{1-4}$alkoxy-$C_{2-4}$alkyl)-amino sulphonyl, di($C_{1-4}$alkoxy $C_{2-4}$alkyl) amino sulphonyl and phenylaminosulphonyl.

A3

More preferred substituents on the aromatic groups of $R_1$ or $R_2$ are halogen (chloro or bromo) $C_{1-4}$alkyl, $C_{1-4}$alkoxy or acetyl.

Preferably $X^+$ is $X_1^+$ where $X_1^+$ is selected from alkali metal ions (especially $Na^+$ and $K^+$), ammonium, mono $C_{1-4}$alkyl ammonium, di($C_{1-4}$alkyl)ammonium, tri($C_{1-4}$alkyl)ammonium and (most preferred) 4-amino-2,2,6,6-tetra-alkylpiperidinium, 4-hydroxy-2,2,6,6-tetra-alkylpiperidinium and 4-keto-2,2,6,6-tetraalkylpiperidinium.

More preferably $X^+$ is $X_2^+$ where $X_2^+$ is a sodium, potassium, ammonium, 4-amino-2,2,6,6-tetramethyl-piperidinium, 4-hydroxy-2,2,6,6-tetramethylpiperidinium or 4-keto-2,2,6,6-tetramethylpiperidinium.

Preferred compounds of formula I are of formula Ia and Ib

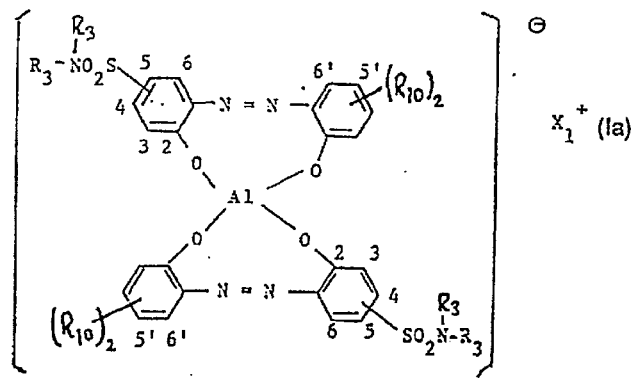

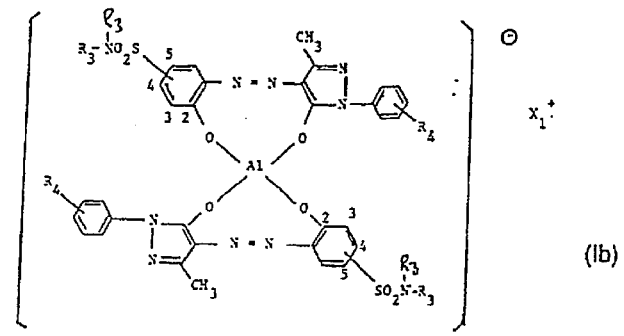

A 4 in which each $R_{10}$ independently is selected from hydrogen, halogen, hydroxy, $C_{1-4}$alkyl,
$C_{1-4}$alkoxy, acetyl, benzoyl and 4,6-bis(2',4'-dimethylphenyl)-triazinyl-2 or both
groups $R_{10}$ together with the phenyl ring to which they are attached can form a
naphthyl group (preferably in 5' and 6' position);

each $R_3$ independently is hydrogen, $C_{1-4}$alkyl, $C_{1-2}$alkoxy-$C_{2-3}$alkyl or phenyl and
$R_4$ is hydrogen, halogen, methyl, ethyl, methoxy or ethoxy and
$X^+_1$ is as defined above.

Preferred compounds of formula II are of the formula IIa

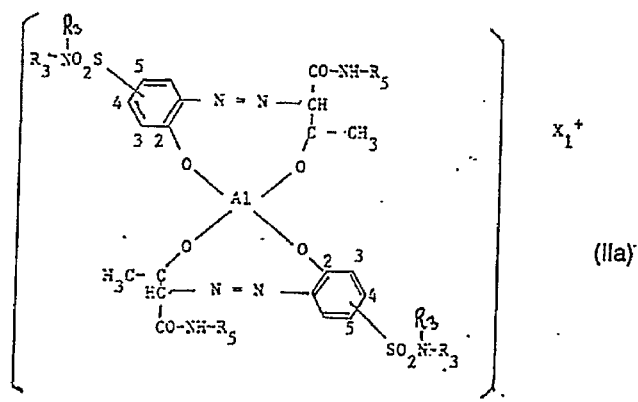

in which each $R_3$ independently is hydrogen, $C_{1-4}$alkyl, $C_{1-2}$alkoxy-$C_{2-3}$alkyl or phenyl, each $R_5$ independently is a 2-ethyl hexyl or a phenyl group, unsubstituted or substituted
by 1 to 3 substituents selected from chloro, bromo, $C_{1-4}$alkyl, $C_{1-4}$alkoxy and acetyl
(or preferably one or two $C_{1-2}$alkoxy groups and/or one chloro or bromo atom or
one methyl group, especially one or two methoxy groups).

Preferably in the compound of the invention the $-SO_2NH-R_3$ groups are in the 4 or 5
position.

A 5

Preferably $R_{10}$ is $R_{10}'$ where each $R_{10}'$ independently is selected from hydrogen, hydroxyl, acetyl and benzoyl.

Compounds of formula I can be prepared by known methods for producing 2:1 metal complex dyes, for example by coupling a diazotized amine of formula III

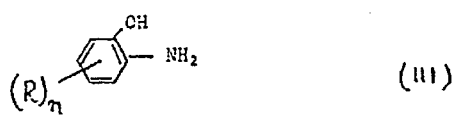   (III)

with a compound of formula IV

   (IV)

where R and $R_1$ are as defined above,
followed by metallization and introducing of the cation.

Compounds of formula II can be prepared by known methods for producing 2:1 metal complex dyes for example by coupling a diazotized compound of formula V

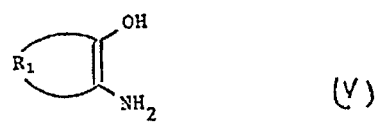   (V)

with a compound of formula VI

   (VI)

where $R_1$ and $R_2$ are as defined above, followed by metallization and introduction of the cation.

A 6

Metallization and introduction of the cation in compounds of formula I or II can also occur at the stage of forming the reactants (compounds of formula III and IV or V and VI respectively).

A 7

Example 1 a) 26.0 parts of 2-aminophenol-4-(3'-methoxypropylamino-sulphonyl) are stirred into a mixture of 200 parts of water and 70 parts of 30% HCl. After the addition of 50 parts of ice, the amine is diazotized by the addition of 26.2 parts by volume of 4N Na NO$_2$ solution. The resulting suspension is stirred for 3 hours at 0°C and then is poured into a solution of 13.7 parts of β-naphthol in 190 parts of water and 9.5 parts of 30% NaOH are slowly added. By the simultaneous addition of a further 70 parts of 30% NaOH, the pH is brought to 9.5-10. The resulting mixture is then stirred at room temperature for 8 hours and brought to pH 1.5 by the addition of 30% HCl. The resulting precipitate is filtered, washed with 4000 parts of water and dried.

b) 44.19 parts of the monoazo dyestuff of part a) above are suspended in a mixture of 110 parts of water and 25 parts of 30% NaOH. This is warmed to 70°C and stirred for 1 hour. The pH value of the suspension is 12.3. After further warming to 90°C, over 1 hours a solution of 17.1 parts of aluminium sulphate (water free) in 340 parts of water is added, whereby a voluminous suspension of the aluminium complex results and the pH value sinks to 10.9. The temperature is allowed to sink to 45°C over 2 hours (while stirring well) and the suspension is slowly reacted with a solution of 8.58 parts of triacetondiamine in 10 parts of water and 11.2 parts of 30% HCl. The resulting precipitate is brought to pH 5.4 by the addition of above 2.4 parts of HCl. The mixture is stirred a further hour at room temperature, filtered and the residue is washed salt-free and then dried. A compound of formula Ia

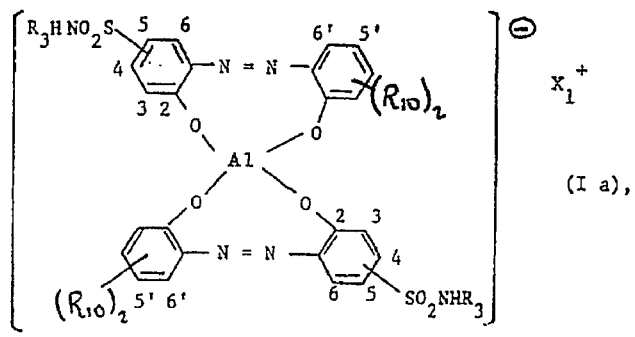

(I a),

A 8 in which $R_3$ is methoxypropyl, both groups $R_{10}$ together with the phenyl group to which they are attached form a naphthyl group (5',6' position) and the sulphonamide groups are both in the five position.

The resulting dye dyes plastics material a bluish-red nuance and has a solubility in ethanol of about 100g/l.

Example 2

By a method analogous to that of Example 1, 12.12 parts of 2-hydroxy-4-methylamino sulphonyl aniline are diazotized and then coupled with 1-phenyl-3-methylpyrazolane-5 and then heated with aluminium sulphate, NaOH and triacetondiaminochlorohydrate to form the resulting 2:1 aluminium complex of formula Ib

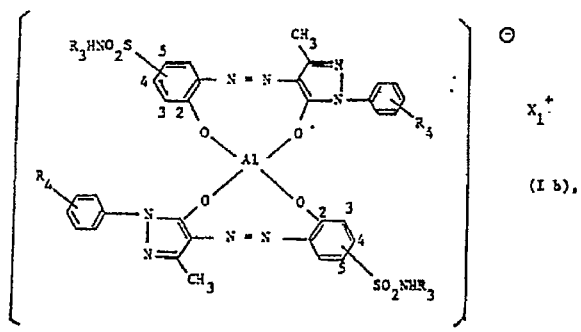

(I b), in which $R_3$ is methyl ;

$R_4$ is hydrogen and the sulponami de group is in the 4-position.

Example 3

26.4 parts of 2-hydroxy-4-phenylamino sulphonyl aniline are stirred into a solution of 350 parts of water and 50 parts of 30%HCl. After the addition of 100 parts of ice, the amine

A 9 is diazotized with 27 parts by volume of 4N NaNO₂ solution. After stirring for 3 hours at 0°C, the resulting diazonium salt solution is slowly added to a a mixture of 12.5 parts of 2,5-dimethoxyacetylacetanilide, 9.3 parts of 2-methoxyacetoacetylanilide, 9 parts of 30% NaOH solution, 150 parts of water, 9 parts of glacial acetic acid and 100 parts of ice. The pH is held at 4.5 by the addition of 35 parts of 30% NaOH.

Finally the resulting monoazo dyestuff, analogously to the process of Example 1 is reacted with 30% NaOH, aluminium sulphate and triacetonamine to form a 2:1 aluminium complex dyestuff of formula IIa

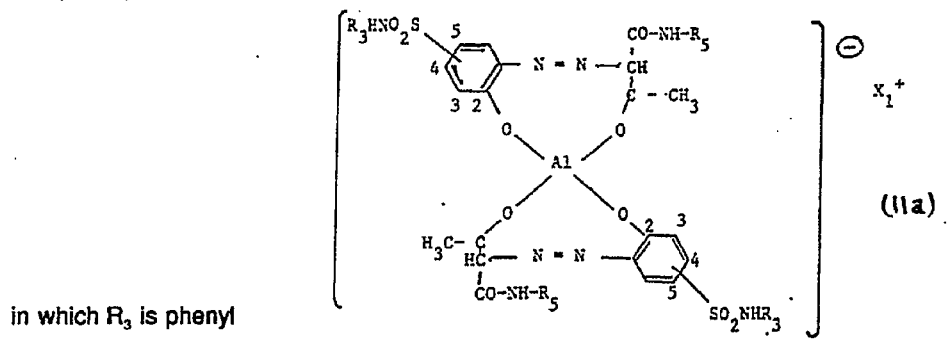

in which $R_3$ is phenyl $R_4$ is 2,5-dimethoxy phenyl (and 2-monomethoxy phenyl) and the sulphonamide groups are in the 4-position.

The resulting dyestuff colors nitrocellulose lacquers a yellow tone.

Examples 4-21

Compounds of the formula 1

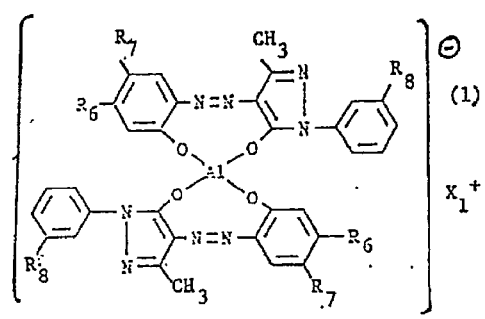

A 10 in which the symbols are defined in Table 1 below can be prepared from appropriated reactants by a method analogous to any one of Example 1-3 above.

The nuances of dyeings with the dyes of Example 4-21 in nitrocellulose lacquer are reddish yellow.

A11

TABLE 1

| Example No. | $R_6$ | $R_7$ | $R_8$ | $X_1^+$ |
|---|---|---|---|---|
| 4 | $-SO_2NHC_6H_5$ | H | H | 1) |
| 5 | H | $-SO_2NHCH_3$ | H | 1) |
| 6 | H | do. | H | 2) |
| 7 | $-SO_2NHC_6H_5$ | H | H | 2) |
| 8 | $-SO_2NH(CH_2)_3OCH_3$ | H | H | 2) |
| 9 | H | $-SO_2NH(CH_2)_3OCH_3$ | H | 2) |
| 10 | H | do. | H | 1) |
| 11 | H | $-SO_2NHC_6H_5$ | H | 1) |
| 12 | H | do. | H | 3) |
| 13 | $-SO_2NHCH_3$ | H | H | 2) |
| 14 | do. | H | H | 3) |
| 15 | do. | H | $-OCH_3$ | 1) |
| 16 | $-SO_2NHC_6H_5$ | H | H | 3) |
| 17 | H | $-SO_2NHCH_3$ | H | 3) |
| 18 | H | do. | H | Na |
| 19 | H | do. | $-CH_3$ | 1) |
| 20 | H | do. | Cl | 4) |
| 21 | $-SO_2NHCH_3$ | H | $-OCH_3$ | 5) | where in the $X_1^+$ column of Tables 1-4, the cation $X_1^+$ is as follows:

A 12
1)= 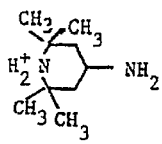
2)= 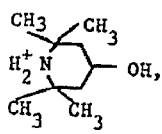
3)= 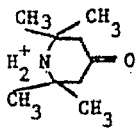
4)= monoethanolammonium
5)= ethylhexylammonium
Compounds of the formula 2
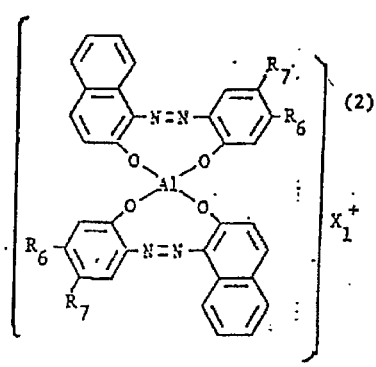
in which the symbols are defined in Table 1 below can be prepared from appropriate reactants by a method analogous to any one of Example 1-3 above.

A 13

The nuances of dyeings with the dyes of Example 22-43 in nitrocellulose lacquer are bluish red.

TABLE 2

| Example No. | $R_6$ | $R_7$ | $X_1^+$ |
|---|---|---|---|
| 22 | $-SO_2NH(CH_2)_3OCH_3$ | H | 1) |
| 23 | do. | H | 3) |
| 24 | $-SO_2NHC_6H_5$ | H | 1) |
| 25 | do. | H | 2) |
| 26 | do. | H | 3) |
| 27 | $-SO_2NHCH_3$ | H | 1) |
| 28 | do. | H | 2) |
| 29 | do. | H | 3) |
| 30 | do. | H | 4) |
| 31 | do. | H | 5) |
| 32 | H | $-SO_2NHC_6H_5$ | 1) |
| 33 | H | do. | 2) |
| 34 | H | do. | 3) |
| 35 | H | do. | Na |
| 36 | H | $-SO_2NH(CH_2)_3OCH_3$ | K |
| 37 | H | do. | 2) |
| 38 | H | do. | 3) |
| 39 | H | do. | 4) |

A 14

| Example No. | $R_6$ | $R_7$ | $X_1^+$ |
|---|---|---|---|
| 40 | H | $-SO_2NHCH_3$ | 1) |
| 41 | H | do. | 2) |
| 42 | H | do. | 3) |
| 43 | H | do. | K |

Examples 44-79

Compounds of formula 3

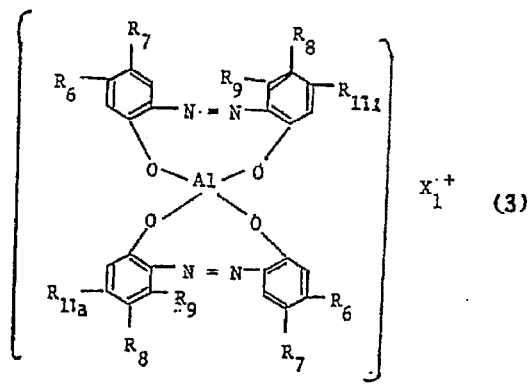

(3)

which are always mixtures wherein one of $R_9$ and $R_{11a}$ on a phenyl ring is OH and the other is hydrogen and the other symbols are defined in Table 3, can be prepared analogously to any one of the methods of Examples 1 to 3 from known compounds. These dyes dye nitrocellulose lacquers a red nuance.

A 15

TABLE 3

| Example No. | $R_6$ | $R_7$ | $R_8$ | $X_1^+$ |
|---|---|---|---|---|
| 44 | -SO$_2$NHCH$_3$ | H | -COCH$_3$ | 1) |
| 45 | do. | H | -COC$_6$H$_5$ | 1) |
| 46 | do. | H | do. | 2) |
| 47 | do. | H | do. | 3) |
| 48 | -SO$_2$NHC$_6$H$_5$ | H | do. | 3) |
| 49 | do. | H | do. | 1) |
| 50 | do. | H | do. | 2) |
| 51 | -SO$_2$NH(CH$_2$)$_3$OCH$_3$ | H | do. | 1) |
| 52 | do. | H | do. | 2) |
| 53 | do. | H | do. | 3) |
| 54 | H | -SO$_2$NHCH$_3$ | do. | Na |
| 55 | H | do. | do. | 2) |
| 56 | H | do. | do. | 2) |
| 57 | H | do. | do. | 4) |
| 58 | H | -SO$_2$NHC$_6$H$_5$ | do. | 1) |
| 59 | H | do. | do. | 2) |
| 60 | H | do. | do. | 3) |
| 61 | H | -SO$_2$NH(CH$_2$)$_3$OCH$_3$ | do. | 1) |

A 16

| Example No. | $R_6$ | $R_7$ | $R_8$ | $X_1^+$ |
|---|---|---|---|---|
| 62 | H | $-SO_2NH(CH_2)_3OCH_3$ | $-COC_6H_5$ | 2) |
| 63 | H | do. | do. | 3) |
| 64 | $-SO_2NHCH_3$ | H | 2,4-Bis-(2',4'-dimethylphenyl)-triazinyl-6 | 1) |
| 65 | $-SO_2NHC_6H_5$ | H | do. | 1) |
| 66 | do. | H | do. | 2) |
| 67 | do. | H | do. | 3) |
| 68 | do. | H | do. | Na |
| 69 | $-SO_2NH(CH_2)_3OCH_3$ | H | do. | 1) |
| 70 | do. | H | do. | 2) |
| 71 | do. | H | do. | 3) |
| 72 | H | $-SO_2NHCH_3$ | do. | 1) |
| 73 | H | do. | do. | 2) |
| 74 | H | do. | do. | 3) |
| 75 | H | $-SO_2NHC_6H_5$ | do. | 1) |
| 76 | H | do. | do. | 2) |
| 77 | H | do. | do. | 3) |
| 78 | H | do. | do. | 4) |
| 79 | H | do. | do. | 5) |

A 17
Examples 80-126
Compounds of formula 4
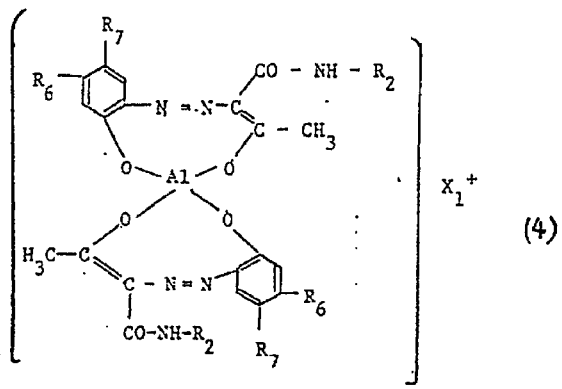
(4)
in which the symbols are defined in Table 4 below can be made from known compounds by a method analogous to any one of Examples 1 to 3. These dye color nitrocellulose a yellow nuance.
TABLE 4
| Example No. | $R_2$ | $R_6$ | $R_7$ | $X_1^+$ |
|---|---|---|---|---|
| 80 | 2,5-dimethoxy phenyl | H | -SO$_2$NHCH$_3$ | 1) |
| 81 | do. | H | do. | 2) |
| 82 | do. | H | do. | 3) |
| 83 | do. | H | do. | Na |
| 84 | do. | H | do. | 4) |
| 85 | do. | H | do. | 5) |

A18

| Example No. | $R_2$ | $R_6$ | $R_7$ | $X_1^+$ |
|---|---|---|---|---|
| 86 | 2,5-dimethoxy phenyl | H | -SO$_2$NHC$_6$H$_5$ | 1) |
| 87 | do. | H | do. | 2) |
| 88 | do. | H | do. | 3) |
| 89 | do. | H | -SO$_2$NH(CH$_2$)$_3$OCH$_3$ | 1) |
| 90 | do. | H | do. | 2) |
| 91 | do. | -SO$_2$NHCH$_3$ | H | 2) |
| 92 | do. | do. | H | 3) |
| 93 | do. | -SO$_2$NHC$_6$H$_5$ | H | 1) |
| 94 | do. | do. | H | 1) |
| 95 | do. | -SO$_2$NH(CH$_2$)$_3$OCH$_3$ | H | 1) |
| 96 | do. | do. | H | 2) |
| 97 | 2-methoxyphenyl | do. | H | 1) |
| 98 | do. | H | -SO$_2$NHCH$_3$ | 1) |
| 99 | do. | H | do. | 2) |
| 100 | do. | H | do. | 3) |
| 101 | do. | H | -SO$_2$NHC$_6$H$_5$ | 1) |
| 102 | do. | H | do. | 2) |
| 103 | do. | H | do. | 1) |
| 104 | do. | H | -SO$_2$NH(CH$_2$)$_3$OCH$_3$ | 1) |

A19

| Example No. | $R_2$ | $R_6$ | $R_7$ | $X_1^+$ |
|---|---|---|---|---|
| 105 | 2-methoxyphenyl | H | -SO$_2$NH(CH$_2$)$_3$OCH$_3$ | 3) |
| 106 | 2-ethylhexyl | H | -SO$_2$NHCH$_3$ | 1) |
| 107 | do. | H | do. | 2) |
| 108 | do. | H | do. | 3) |
| 109 | do. | H | -SO$_2$NHC$_6$H$_5$ | 1) |
| 110 | do. | H | do. | 2) |
| 111 | do. | H | do. | 3) |
| 112 | do. | H | -SO$_2$NH(CH$_2$)$_3$OCH$_3$ | 1) |
| 113 | do. | H | do. | 2) |
| 114 | do. | H | do. | 3) |
| 115 | do. | -SO$_2$NHCH$_3$ | H | 1) |
| 116 | do. | do. | H | 2) |
| 117 | do. | do. | H | Na |
| 118 | do. | do. | H | 4) |
| 119 | do. | do. | H | 5) |
| 120 | do. | -SO$_2$NHC$_6$H$_5$ | H | 1) |
| 121 | do. | do. | H | 2) |
| 122 | do. | do. | H | 3) |
| 123 | do. | do. | H | K |
| 124 | do. | -SO$_2$NH(CH$_2$)$_3$OCH$_3$ | H | 1) |

A20

| Example No. | $R_2$ | $R_6$ | $R_7$ | $X_1^+$ |
|---|---|---|---|---|
| 125 | 2-ethylhexyl | $-SO_2NH(CH_2)_3OCH_3$ | H | 2) |
| 126 | do. | do. | H | 3) |

Example 127

By a method analogous with that of any one of Examples 1-3, a mixture of 26.0 parts of 2-aminophenyl-4-(3'-methoxypropylaminosulphonyl) and 26.0 parts of 2-hydroxy-4-(3'-methoxypropylaminosulphonyl)aniline are diazotized with 52.4 parts by volume of 4N $NaNO_2$. This is then coupled with 42.8 parts of 2,4-dihydroxy-benzophenone and the resulting azo dyestuff is reacted with 17.1 parts of aluminium sulphate and 15.6 parts of triacetondiamine. The reaction product is then isolated and purified. The resultant dyestuff mixture colors nitrocellulose lacquers reddish tones.

Example 128

By a method analogous to that of Example 1, a mixture of 10.5 parts of 2-hydroxy-4-methylaminosulphonyl) aniline and 13 parts of 2-aminophenol-4-(3'-methoxypropylamino sulphonyl) are diazotized. This is then coupled with 21.4 parts of 2,4-dihydroxybenzophenone. After reaction with 8.55 parts of aluminium sulphate (water-free) and 7.75 parts of triacetonamine, a dyestuff mixture results that colors nitrocellulose red tones.

A21

Application Example 5 parts of the dyestuff of Example 1b in a Dissolver apparatus are stirred into 95 parts of a nitrocellulose lacquer prepared from:

| | |
|---|---|
| 18.8% | of Nitrocellulose A15 (in the form of white flocs wetted with 35% isopropanol) |
| 6.3% | of an acrylic acid butyl ester polymer, a softener resin (Acronal 4F from BASF) |
| 3.3% | of diphenyloctylphosphate, a softener (Santiciser 141 from Monsanto) |
| 10.0% | of methoxy propanol (Dowanol PM from Dow Chemical) |
| 10.0% | ethoxypropanol |
| 41.6% | ethanol, and |
| 10.0% | ethyl acetate. |

This is dissolved overnight in a rolling block. The solubility is very good.

With a 25mm blade, a wet film of this lacquer composition is placed on aluminium foil and the lacquer is dried for 5 hours at 130°C. A bluish red lacquer coating results with good light and migration fastness properties.

The application example can be repeated using 5 parts of any one of the new dyes of the invention of Examples 2-128 in place of that of Example 1b. --

We claim:

1. A process for the preparation of a liquid dyestuff composition comprising the steps of:

mixing an aqueous presscake with a water content of 30–60% by weight of a C.I. Solvent Dye into a water miscible organic solvent; and subsequently raising the temperature of the mixture to provide a liquid dyestuff composition consisting essentially of per 100 parts by weight:

in excess of 0 parts and up to 15 parts water, at least 25 parts of a C.I. Solvent Dye, and a water miscible organic solvent.

2. The process of claim 1 wherein the dye is selected from: CI Solvent Black 45, CI Solvent Blue 44, CI Solvent Brown 28, CI Solvent Red 8, CI Solvent Red 91, CI Solvent Red 92, CI Solvent Red 127, CI Solvent Red 124, CI Solvent Red 89, CI Solvent Red 90:1, CI Solvent Orange 41, CI Solvent Orange 62, CI Solvent Yellow 83, CI Solvent Yellow 62, CI Solvent Yellow 48, CI Solvent Yellow 79, CI Solvent Yellow 83:1, and non-metallized CI Solvent Blue 45.

3. The process of claim 1 wherein the water miscible organic solvent is selected from: aprotic solvents, alkanols, ethers, and ketones.

4. The process of claim 1 wherein the water miscible organic solvent is selected from: propylene glycols, tetrahydrofurfuryl alcohol, dimethylformamide, and dimethylsulphoxide.

5. The process of claim 1 wherein the water miscible organic solvent is one capable of forming an azeotropic mixture with water.

6. The process of claim 1 wherein the aqueous presscake of the C.I. Solvent Dye comprises from 40 parts by weight to 60 parts by weight water.

7. A liquid dyestuff composition produced by:

mixing an aqueous presscake of a C.I. Solvent Dye into a water miscible organic solvent; and subsequently raising the temperature of the mixture to provide a liquid dyestuff composition consisting essentially of per 100 parts by weight:

in excess of 0 parts and up to 15 parts water, at least 25 parts of a C.I. Solvent Dye, and a water miscible organic solvent.

8. The liquid dyestuff composition of claim 7 wherein the Dye is selected from: CI Solvent Black 45, CI Solvent Blue 44, CI Solvent Brown 28, CI Solvent Red 8, CI Solvent Red 91, CI Solvent Red 92, CI Solvent Red 127, CI Solvent Red 124, CI Solvent Red 89, CI Solvent Red 90:1, CI Solvent Orange 41, CI Solvent Orange 62, CI Solvent Yellow 83, CI Solvent Yellow 62, CI Solvent Yellow 48, CI Solvent Yellow 79, CI Solvent Yellow 83:1, and non-metallized CI Solvent Blue 45.

9. The liquid dyestuff composition of claim 7 wherein the water miscible organic solvent is selected from: aprotic solvents, alkanols, ethers, and ketones.

10. The liquid dyestuff composition of claim 7 wherein the water miscible organic solvent is selected from: propylene glyclols, tetrahydrofurfuryl alcohol, dimethylformamide, and dimethylsulphoxide.

11. A dye-containing nitrocellulose lacquer composition comprising as the dye component the liquid dyestuff composition of claim 7.

* * * * *

UNITED STATES PATENT AND TRADEMARK OFFICE
CERTIFICATE OF CORRECTION

PATENT NO. : 5,626,634

DATED : April 29, 1997

INVENTOR(S) : Richard S. Schwartz

It is certified that error appears in the above-identified patent and that said Letters Patent is hereby corrected as shown below:

In the Abstract, line 1, please add --present-- before "invention".
In column 1, line 1, please add --A-- before "HYPOCHLORITE".
In column 6, table 1, please make the following changes:
    In row 5, please bold the numbers "3.15" and "3.00".
    In row 10, please bold the numbers "2.30" and "2.65".
    In row 11, please bold the numbers "3.53", "3.93", and "2.82".
    In row 13, please bold the numbers "3.56" and "2.90".
    In row 16, please bold the numbers "3.52" and "3.46".
    In row 19, please bold the number "2.83".
    In row 21, column 1, please add --pH 6--.
    In row 22, please delete "pH 6".
In column 6, please delete lines 32 and 33.
In column 6, table 2, please make the following changes:
    In row 13, please bold the numbers "3.96" and "2.78".
    In row 14, please bold the numbers "3.74", "3.06", and "3.78".
    In row 17, please bold the numbers "3.37" and "2.16".
In column 6, please delete lines 64 and 65.
In column 9, claim 7, line 11, please change "4" to --6--.
In column 10, claim 12, line 10, please change "elginate" to --alginate--.

Signed and Sealed this

Nineteenth Day of May, 1998

Attest:

BRUCE LEHMAN

Attesting Officer     Commissioner of Patents and Trademarks